May 7, 1957  G. W. RICHARDSON  2,791,083
ROOT CROP TOP HARVESTING MACHINES
Filed Aug. 24, 1953  3 Sheets-Sheet 1

Inventor
George Wilfred Richardson
By
Norris & Bateman
Attorneys

May 7, 1957   G. W. RICHARDSON   2,791,083
ROOT CROP TOP HARVESTING MACHINES
Filed Aug. 24, 1953   3 Sheets-Sheet 3

Inventor
George Wilfred Richardson
By
Attorneys

United States Patent Office 2,791,083
Patented May 7, 1957

2,791,083

ROOT CROP TOP HARVESTING MACHINES

George Wilfred Richardson, Barrow-on-Humber, England, assignor of two-thirds to Thomas Brierley and Alan Courtley, both of Derker, Oldham, England, jointly Application August 24, 1953, Serial No. 376,173

3 Claims. (Cl. 56—121.45)

This invention relates to improvements in tractor drawn root crop harvesting machines for harvesting crops such as sugar beet, mangles, swedes, carrots and the like.

The object of the invention is to sever the tops or foliage from the crop without damage thereto, the position of the cutter being raised or lowered and moved transversely automatically according to the size and location of the crop.

According to the invention the machine comprises a frame mounted alongside a tractor and supported at the rear end thereby and by a wheel driven from the tractor, and at the forward end by inclined discs adapted to engage each plant as the frame passes thereover, a stationary cutter being mounted between the discs adapted to sever the tops from the root and a pair of endless belts driven from the tractor to transport the tops after severing.

The invention will be described with reference to the accompanying drawings.

Figure 2:
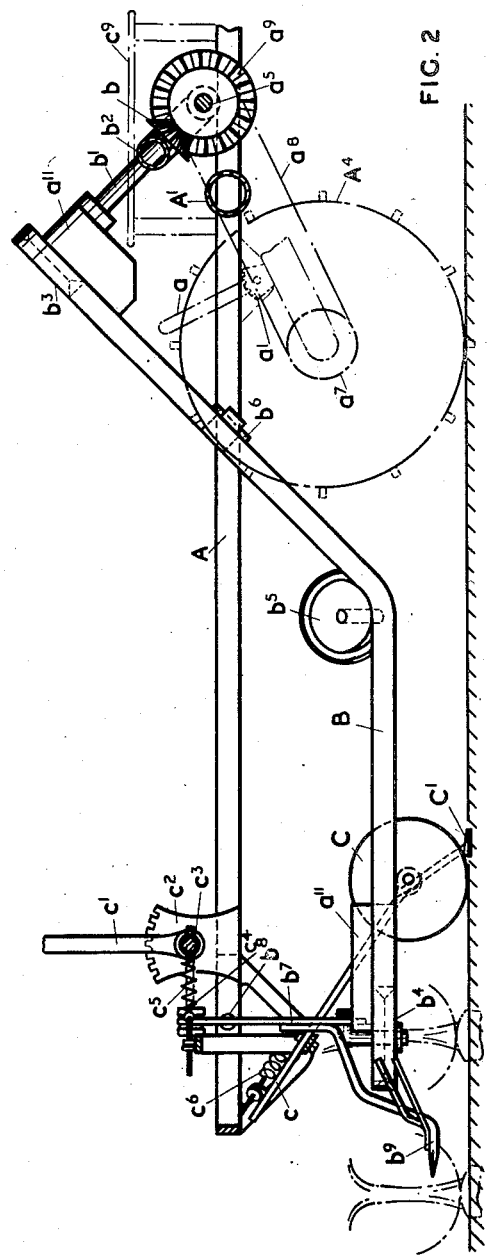
Fig. 2 is a side elevation of same.
Figure 3:
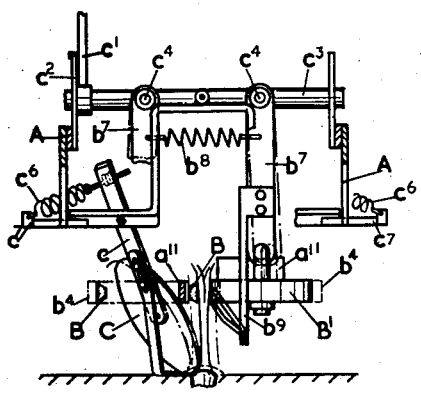
Fig. 3 is a detail front view partly in section of part of the machine.

The machine is constructed with a frame A supported at its rear end by a tubular member $A^1$ extending behind a tractor wheel $A^2$ and affixed to the usual implement attachment on the tractor to be capable of being lifted for transport purposes. The frame is also supported at its rear end by a wheel $A^4$ adjustably mounted on stub shaft $a^{12}$ on the frame A to allow for variation of the height of the frame. The adjustment of the frame A relatively to the wheel $A^4$ is effected through a hand lever $a$ shown in long and short dots in Fig. 2 operating over a notched quadrant $a^1$.

The wheel $A^4$ is driven by sprocket wheels $a^2$, $a^3$, chain $a^4$, a transverse shaft $a^5$ journalled in the frame A, sprocket wheels $a^6$, $a^7$ and chain $a^8$ from the tractor wheel $A^2$ thereby obviating any drag on the tractor due to the frame A being mounted alongside the tractor.

The shaft $a^5$ also carries a pair of bevel wheels $a^9$ driving two bevel pinions $b$ each mounted on a shaft $b^1$ supported in a transverse member $b^2$ on the frame A. A belt pulley $b^3$ is mounted on the upper end of each shaft $b^1$.

Endless belts B, $B^1$ pass over the pulleys $b^3$ and extend to the front end of the frame A to pass around further belt pulleys $b^4$, guide pulleys $b^5$ and tensioning pulleys $b^6$ being mounted on longitudinal members $a^{11}$ on the frame A. The gearing driving the pulleys $b^3$ is arranged to traverse the belts B, $B^1$ in the direction of the arrows Fig. 1 at a speed substantially equal to the forward speed of the tractor whereby the travel of the belts in a direction opposite to that of tractor maintains the belts during this portion of their travel substantially stationary relatively to the ground.

Figure 4:
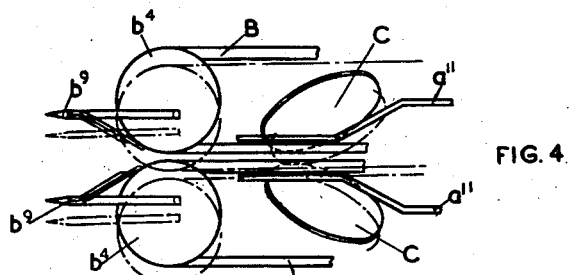
Fig. 4 is a detail plan of the guides.

The pulleys $b^4$ at the forward end of the frame A are carried on depending arms $b^7$ pivotally mounted on a spindle $c^3$. A spring $b^8$ is attached between the arms $b^7$. Each depending arm $b^7$ also carries a pointed guide arm $b^9$ spaced apart as shown in Figs. 1 and 4.

Figure 1:
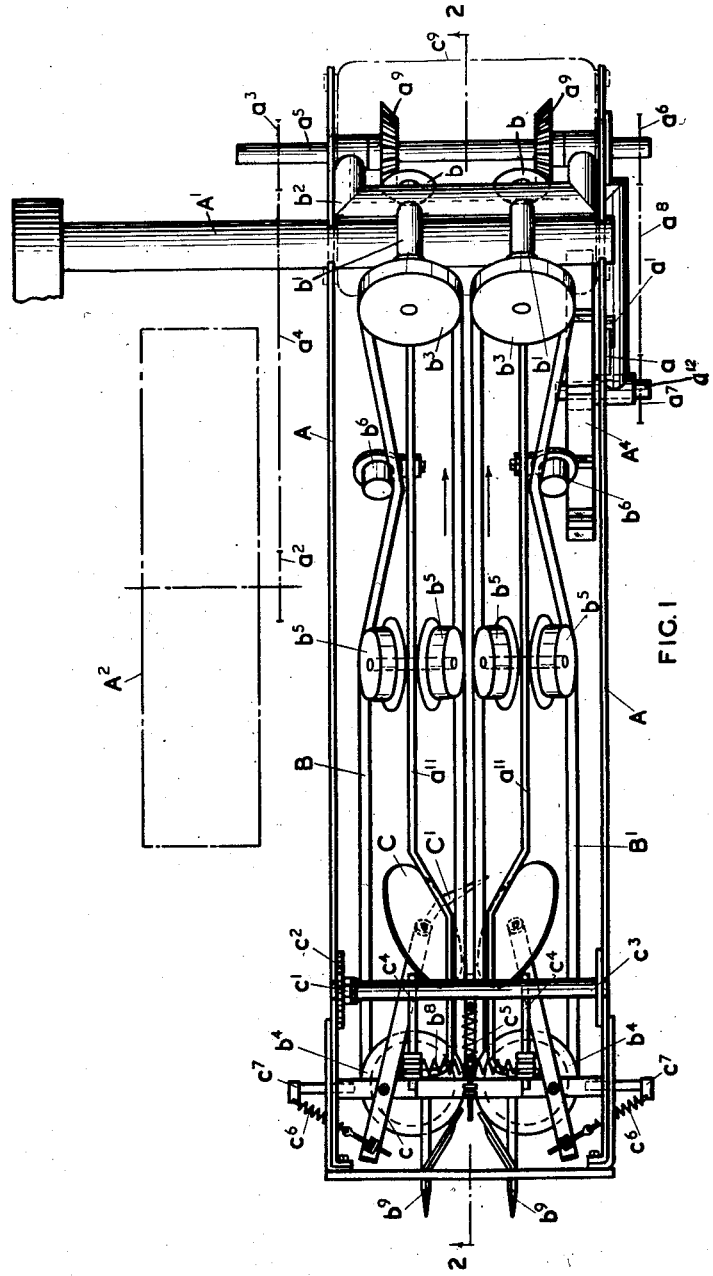
Fig. 1 is a plan of the machine.
Figures 5, 6:
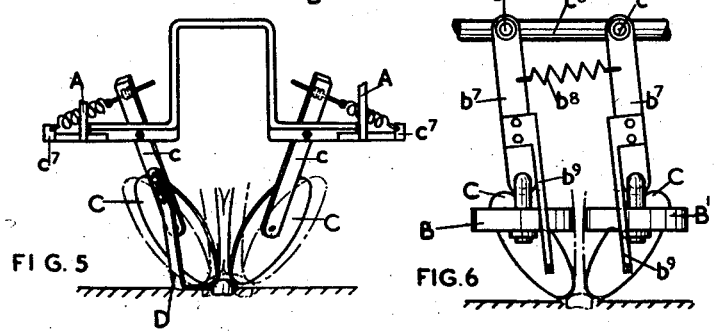
Fig. 5 is a front view of the foliage engaging discs.
Fig. 6 is a front view of the belt mounting.

The belt pulleys $b^4$ supported on the arms $b^7$ pivoted to the spindle $c^3$ as shown in Figs. 1 and 6 are capable of a vertical adjustable movement through a lever $c^1$ operating over a notched quadrant $c^2$ to rotate the spindle $c^3$ and raise or lower rods $c^4$ carrying the supporting brackets for the pulleys $b^4$. The front end of the frame is supported on discs C capable of adjusting their positions vertically relatively to the ground through a spring $c^5$ to allow the discs to rise or fall as they engage a beet or other root crop to assume positions such as shown in long and short dots in Fig. 2.

The discs C may also adjust their relative positions horizontally to accommodate themselves laterally, relatively to the crop through springs $c^6$ connected between the free ends of the arms $c$ and arms $c^7$ on the frame A.

The discs C during their rotation may engage the longitudinal members $a^{11}$ on the frame A carrying the belt pulleys $b^4$ or projections on the arms $c$ may engage the members $a^{11}$ whereby the discs C are moved laterally relatively to the frame as they engage a plant.

The guides $b^9$ engage the tops or foliage of each plant and deflect the belt pulleys $b^4$ to bring the belts B, $B^1$ to each side of the tops or foliage which are gripped between the belts. The movement of the belt pulleys $b^4$ causes a transverse movement of the longitudinal members $a^{11}$ which deflect the discs C to allow the discs C to engage the portion of the plant projecting above ground level.

A horizontal cutter blade $C^1$ is mounted on one disc carrying arm $c$ to project between the adjacent peripheries of the discs C to sever the tops from the plant in proximity thereto without damage to the root.

The tractor is driven along the line of the crop with the frame A vertically above the line or row. The guides $b^9$ engage the tops or foliage on each side of each plant and move the belts B, $B^1$ and discs C transversely to enable the adjacent portions of the peripheries of the discs to engage and ride up over the root as shown in long and short dots in Fig. 2 in order that the cutter $C^1$ may sever the tops adjacent thereto without damage to the root. The tops or foliage pass between the belts B, $B^1$ and are gripped between the two faces thereof by which they are traversed to the rear end of the frame A whilst occupying a substantially stationary position relatively to the ground to prevent pulling from the root. The tops or foliage are thus maintained out of contact with the ground and therefore are kept free from earth. At the rear end of the frame the tops or foliage are discharged from the belts as these latter pass around the pulleys $b^3$ and deposited on a platform $c^9$ from which they may be delivered to a truck drawn by the tractor, or elsewhere.

I claim:

1. A root crop harvesting machine comprising a frame having means for supporting it to travel longitudinally of a row of roots to be harvested, a pair of discs having means mounting them on the frame for rotation in relatively opposed downwardly and forwardly convergent planes with their lower peripheral portions in proximity to one another and spaced laterally of the frame, a cutter having means mounting it on the mounting means for one of said discs for operation in the rear of said discs and at substantially the same level with the lower peripheral portions thereof, a pair of pulleys having means supporting them on the frame in laterally spaced relation in advance of said discs and at a level above that of the lower peripheral portions of the discs for movement transversely of the frame, driving means for said frame rearwardly of said discs, conveyor belts extending around the driving means and the respective pulleys, and a pair of forwardly extending guides spaced laterally of the frame having means connecting them respectively to the supporting means for said pulleys for movement transversely therewith in advance of and above the level of the lower peripheral portions of said discs and below the level of said belts.

2. A root harvesting machine as defined in claim 1, wherein the mounting means for said discs pivotally support said discs for deflection laterally of said frame, and includes means acting to yieldingly move said discs laterally toward one another.

3. A root harvesting machine as defined in claim 1, wherein the mounting means for said discs and cutter pivotally support said discs and cutter for deflection laterally of said frame, and the mounting means for said cutter is connected to the mounting means for one of said discs for deflection laterally therewith.

References Cited in the file of this patent

UNITED STATES PATENTS

| | | |
|---|---|---|
| 1,100,969 | Glinke | June 23, 1914 |
| 1,905,194 | Urschel | Apr. 25, 1933 |
| 2,297,065 | McLendon | Sept. 29, 1942 |
| 2,368,895 | Spiegl | Feb. 6, 1945 |
| 2,585,416 | Weid et al. | Feb. 12, 1952 |